United States Patent [19]

Baker et al.

[11] Patent Number: 4,997,162

[45] Date of Patent: * Mar. 5, 1991

[54] SHEARING GATE VALVE

[75] Inventors: Gerald S. Baker; Loc G. Hoang, both of Houston, Tex.

[73] Assignee: Cooper Industries, Inc., Houston, Tex.

[ * ] Notice: The portion of the term of this patent subsequent to Mar. 27, 2007 has been disclaimed.

[21] Appl. No.: 473,359

[22] Filed: Feb. 1, 1990

Related U.S. Application Data

[63] Continuation-in-part of Ser. No. 384,823, Jul. 21, 1989, Pat. No. 4,911,410.

[51] Int. Cl.⁵ .............................................. F16K 3/312
[52] U.S. Cl. ..................................... 251/327; 251/1.3; 83/694
[58] Field of Search ................. 251/1.1, 1.3, 326, 327, 251/328; 166/54.5, 54.6, 385; 138/94.3; 83/694

[56] References Cited

U.S. PATENT DOCUMENTS

| | | | |
|---|---|---|---|
| 4,081,027 | 3/1978 | Nguyen | 166/55 |
| 4,281,819 | 8/1981 | Linder | 251/328 |
| 4,337,920 | 7/1982 | Parris | 251/357 |
| 4,341,264 | 7/1982 | Cox et al. | 166/55 |
| 4,425,699 | 1/1984 | Nordin | 29/505 |
| 4,519,575 | 5/1985 | Akkerman et al. | 251/58 |
| 4,612,983 | 9/1986 | Karr, Jr. | 166/55 |

Primary Examiner—John C. Fox

[57] ABSTRACT

A shearing type of gate valve having a sleeve of hard wear resistant material in the opening through the gate and coating with insert rings of hard, wear resistant material in the seat rings for shearing a wire line or tubular member extending through the valve and the gate, the sleeve and insert ring being assembled with the gate and the seat rings in a manner to provide sufficient compression preload thereon so that they are not subjected to tension loads which avoids chipping, breaking or other damage to the sleeve and the insert rings. Preferably the sleeve and insert rings are of tungsten carbide. In two modified form of the present invention an insert sleeve of hardened, wear resistant material is provided in the opening of the gate and an insert ring of hardened, wear resistant material is provided in one of the seat rings so that only a single shearing of the cable element is provided so that the short section is not created in the shearing and left in the opening through the gate while it is closed.

4 Claims, 11 Drawing Sheets

SHEARING GATE VALVE

CROSS-REFERENCE TO RELATED APPLICATIONS

The present application is a continuation-in-part application based on the prior copending application identified as U.S. Ser. No. 07/384,823, filed July 21, 1989, now U.S. Pat. No. 4,911,410.

BACKGROUND

The present invention relates to a gate valve capable of shearing a wire line or small pipe extending through its bore. Gate valves have been used for shearing through wire lines and small tubular members but difficulties have been encountered after a shearing has taken place with prior shearing gate valves. Often the problem is that the valve which has accomplished the shearing no longer has a satisfactory seal. An additional problem is that prior shearing gate valves have also damaged the shearing edges during their initial shearing operation and had to be repaired prior to being placed in service thereafter.

U.S. Pat. Nos. 4,519,575 and 4,612,983 disclose typical prior art gate valves adapted for shearing a wire line extending through the valve passages and the gate. U.S. Pat. No. 4,519,575 discloses a gate valve for shearing a wire line on closing and the gate valve includes a special actuator which adds closing force during the last or shearing portion of the stroke. U.S. Pat. No. 4,612,983 discloses a gate valve having a pair of gates in which the lower gate closes and shears the wire line and then the upper gate closes and seals against the upper valve seat.

U.S. Pat. No. 4,281,819 discloses a balanced stem gate valve in which the sealing surfaces are hard, friction resistant sealing surfaces and suggests valve seats of metal or non-metal seat material concentrically disposed interiorly of seat retainers and sealed with sealing rings. Back-up seat rings are provided and are of a hard material such as tungsten carbide.

U.S. Pat. Nos. 4,081,027 and 4,341,264 disclose ram type blowout preventers having shearing type of rams in which the leading edge of the shearing blade of each ram is provided with a hardened shearing surface. In the U.S. Pat. No. 4,081,027 it is suggested that the rams are hardfaced with a layer of nickel-based alloys, cobalt-based alloy and tungsten-based alloys to allow the shearing of a drill pipe. The U.S. Pat. No. 4,341,264 patent suggest the use of a hardened material insert on the leading edges of the shear blades so that it is replaceable and the ram blade can be repaired after any damage during shearing.

U.S. Pat. No. 4,425,699 discloses the method of connecting a mechanical seal ring of hard metal or ceramic to a supporting ring made of aluminum or stainless steel which includes the pressing of the two rings against each other with such force that the supporting ring yields to provide a permanent engagement between the rings.

U.S. Pat. No. 4,337,920 discloses a valve or choke for use in high temperature and extremely abrasive service which includes the use of a sleeve of abrasion resistant material, such as cemented tungsten carbide, silicon carbide, titanium diboride, ceramic material or other material. The sleeve is supported by springs to prevent its damage from vibrations and to insulate it from the effects of differential expansion.

SUMMARY

The present invention relates to a shear type of gate valve in which both the gate and the seat rings include inserts of hard material to assist in the shearing of wire lines or tubular members extending through the valve when it is to be closed. The hard material, such as tungsten carbide, is formed into rings of suitable size and shape which are positioned in their respective recesses in the gate and the seat rings. The recess for each of the rings and the size of the ring are preselected so that the rings, once positioned in their recesses, are maintained in compression at all times. The preferred rings are made of tungsten carbide.

An object of the present invention is to provide an improved shearing type of gate valve in which the gate has a seal which is not damaged by the shearing action of the gate.

Another object is to provide an improved shearing type of gate valve in which the valve may be retained in service after multiple shearing closures of the gate.

A further object is to provide an improved shearing type of gate valve in which a brittle hard material is used without having the brittle material damaged by the shearing action of the valve.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENT

Figure 1:
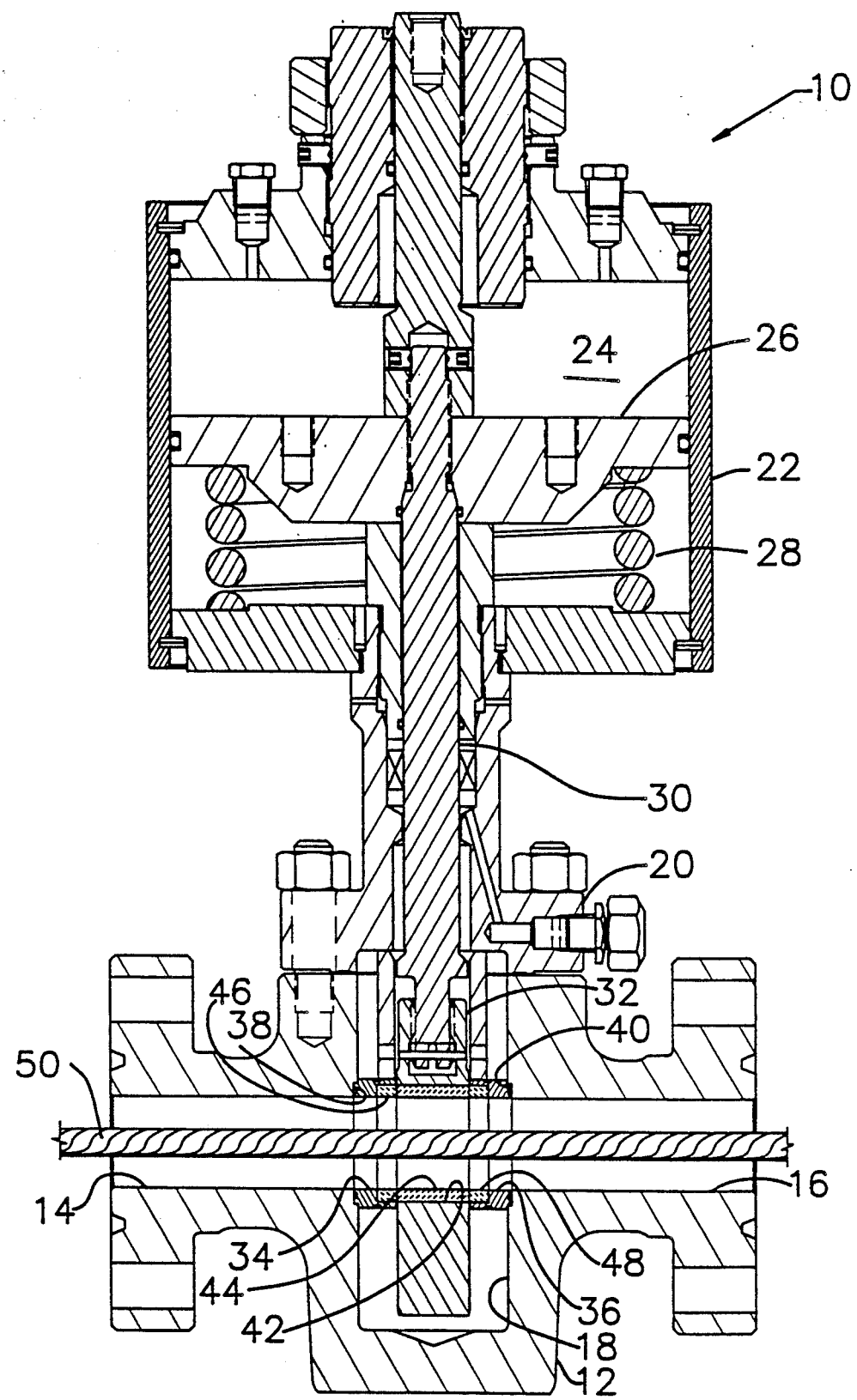
FIG. 1 is sectional view of the improved shearing type of gate valve of the present invention shown in its open position.
Figure 2:
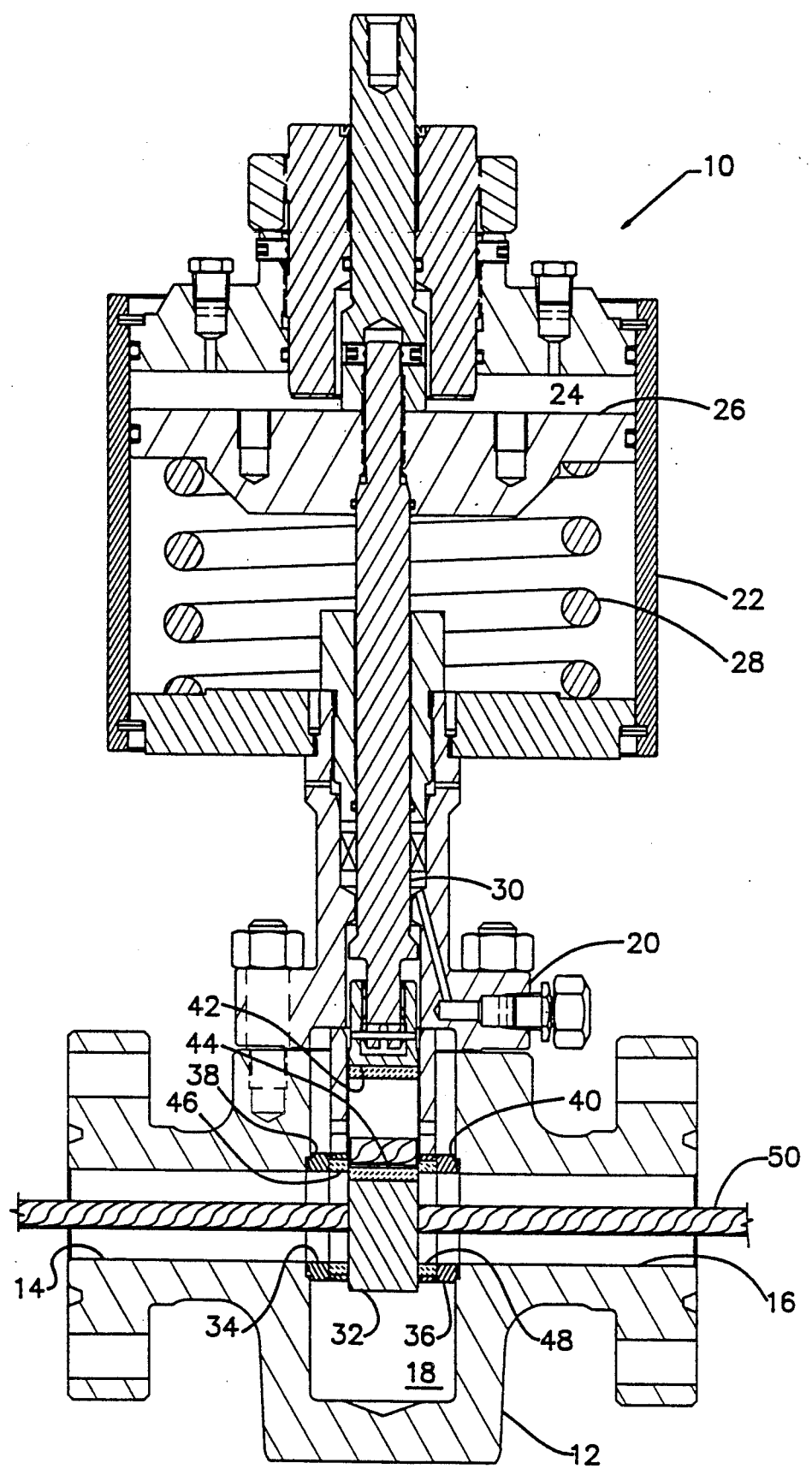
FIG. 2 is a similar sectional view of the valve illustrated in FIG. 1 in closed position after shearing a wire line extending therethrough.

Valve 10, shown in FIGS. 1 and 2, discloses the improved shearing type of gate valve of the present invention. Valve 10 includes body 12 having an inlet 14, an outlet 16 with valve chamber 18 between the inner ends of inlet 14 and outlet 16 and bonnet 20 which is secured to body 12 around the opening of chamber 18 into body 12. Bonnet 20 supports actuator 22 which is shown as a simply pneumatic actuator having piston chamber 24 with piston 26 slidable therein and spring 28 urging piston 26 upward as shown. Connecting rod 30 extends from piston 26 through bonnet 20 into engagement with gate 32 for moving gate 32 within chamber 18 to open or close flow therethrough between inlet 14 and outlet 16.

Gate 32 is positioned between seat rings 34 and 36 which are positioned in recesses 38 and 40 of body 12, respectively, which surround the inner ends of inlet 14 and outlet 16 in chamber 18. Opening 42 which extends through gate 32 is lined with hardened sleeve 44 which coacts with hardened insert rings 46 and 48 positioned in seat rings 34 and 36 in the shearing action of the gate 32 during its closing movement when there is a wire line 50 or a tubular member (not shown) extending through valve 10. The shearing of wire line 50 is shown in FIG. 2. Wire line 50 has been sheared in two places by the action of sleeve 44 on the seat ring insert rings 46 and 48.

Figure 3:
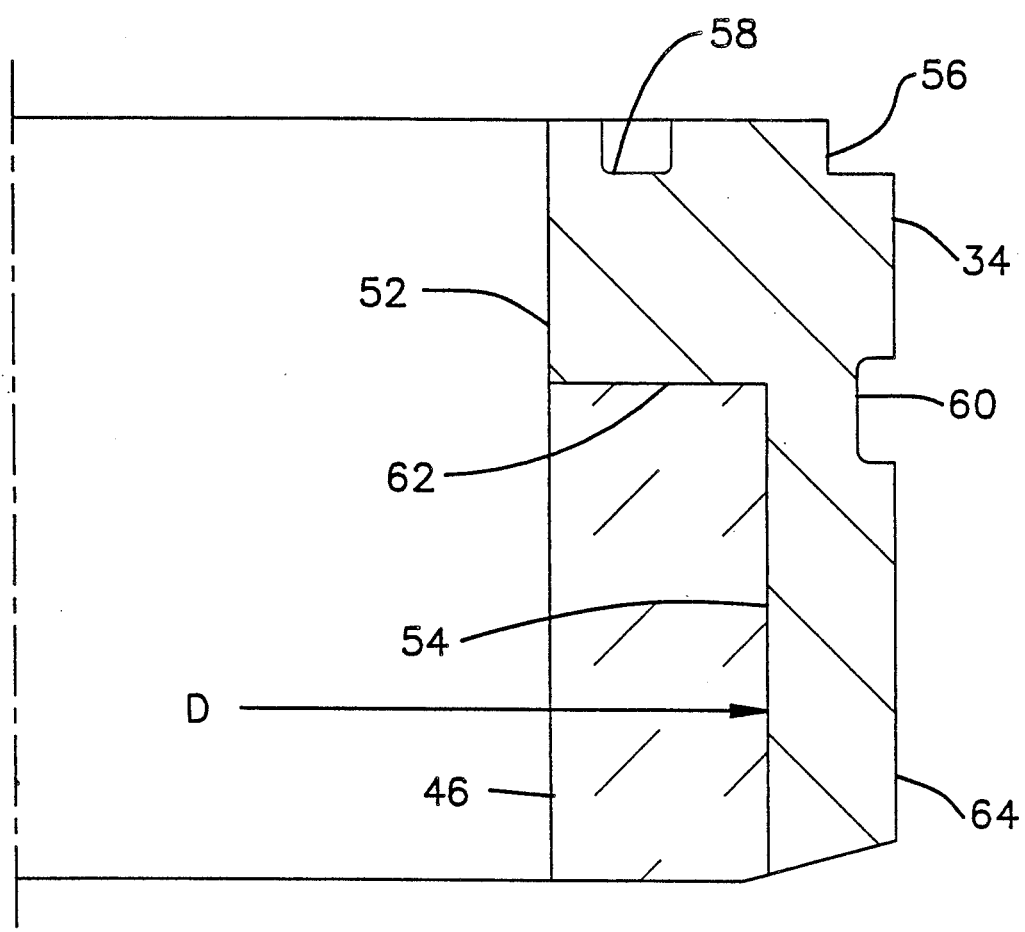
FIG. 3 is a quarter sectional view of the improved seat ring illustrating the insert ring of hard material positioned in a recess in the seat ring.

Seat rings 34 and 36 are identical and seat ring 34 is illustrated in FIG. 3 to explain the details of structure of rings 34 and 36. Ring 34 is annular in shape having bore 52, inner recess 54 on one end, projection 56 on the opposite end with seal ring groove 58 in its face for receiving a suitable seal ring; and external groove 60 in outer surface 64. Ring 34 is sized to fit tightly within recess 38 of body 12. Inner recess 54 is sized to have an inner diameter D which is smaller than the diameter of insert ring 46 prior to assembly. When assembled, insert ring 46 fits within inner recess 54 and abuts shoulder 62 of inner recess 54. Insert ring 48 is identical to insert ring 46.

The external diameter of insert ring 46 and the internal diameter D of recess 54 are selected to have an interference fit. The amount of interference is selected to provide a preselected amount of compression on insert ring 46 after it has been assembled within recess 54. The amount of such compression is to be sufficient to maintain insert ring 46 in compression during all operations including shearing of wire line 50 or a tubular members (not shown) which may be extending through valve 10 when it is to be closed. The reason for placing insert ring 46 in compression is that it is made of a brittle material, such as tungsten carbide or other suitable hard material, which has little strength in tension. By preloading insert ring 46 with sufficient compression to ensure that it is never placed in tension, insert ring 46 is never exposed to conditions which would result in its failure, such as a chipping of its shearing edges. It is suggested that assembly of insert ring 46 with seat ring 34 be accomplished with seat ring 34 heated sufficiently to allow insertion of insert ring 46 without undue loading of either component during assembly. After seat ring 34 has cooled with insert ring 46 positioned in its recess 54, seat ring 34 will shrink sufficiently to provide the desired compression preload of insert ring 46. The compressive preload on insert rings 46 and 48 is sufficient to ensure that there is no relative movement of the insert rings and seat rings 34 and 36 during operation of the gate valve. Groove 60 is provided to allow the seat ring to be removed from the body by prying with a screw driver or similar tool.

Figure 4:
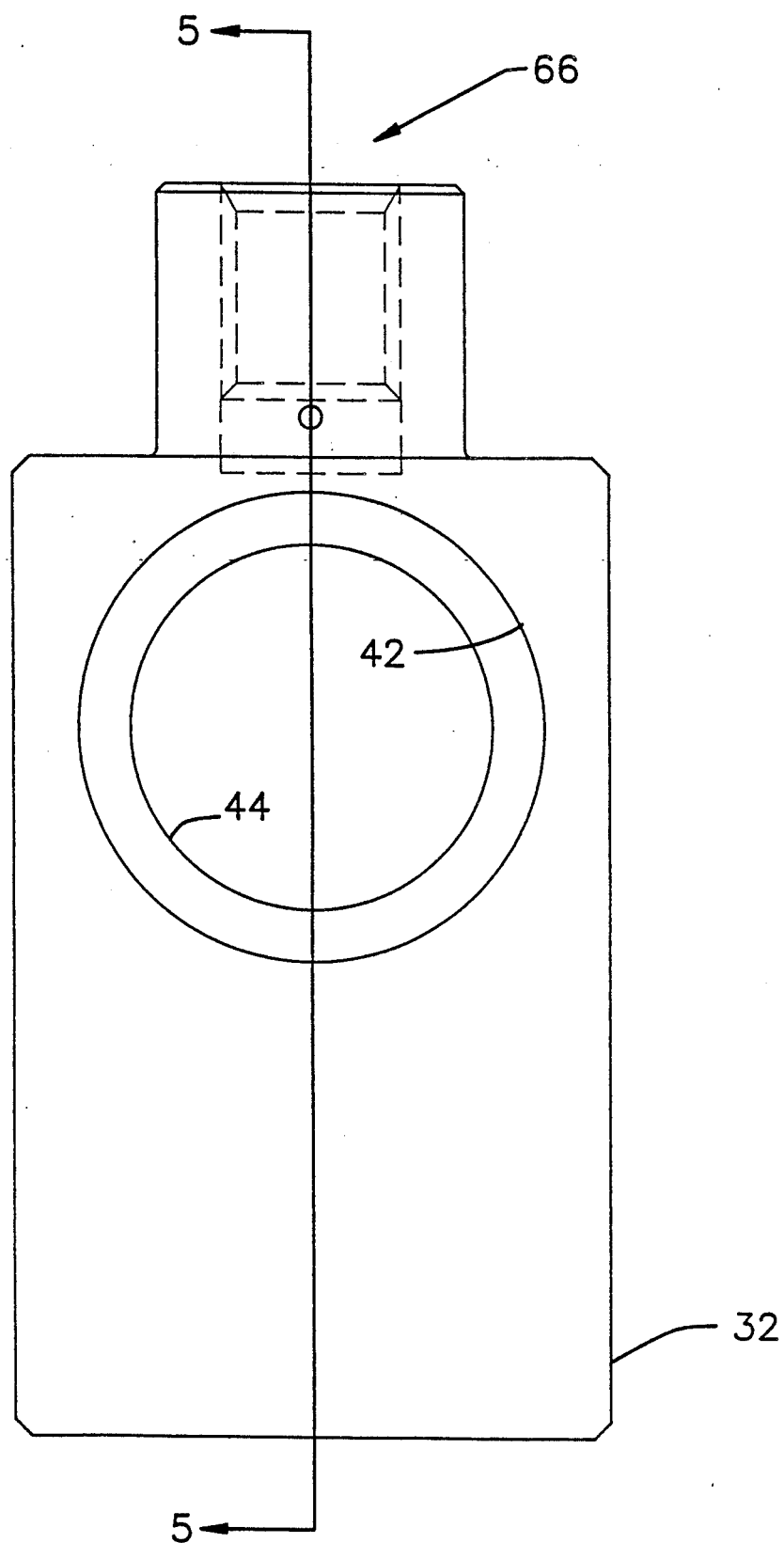
FIG. 4 is an elevation view of the improved gate of the present invention with the hardened ring positioned therein.
Figure 5:
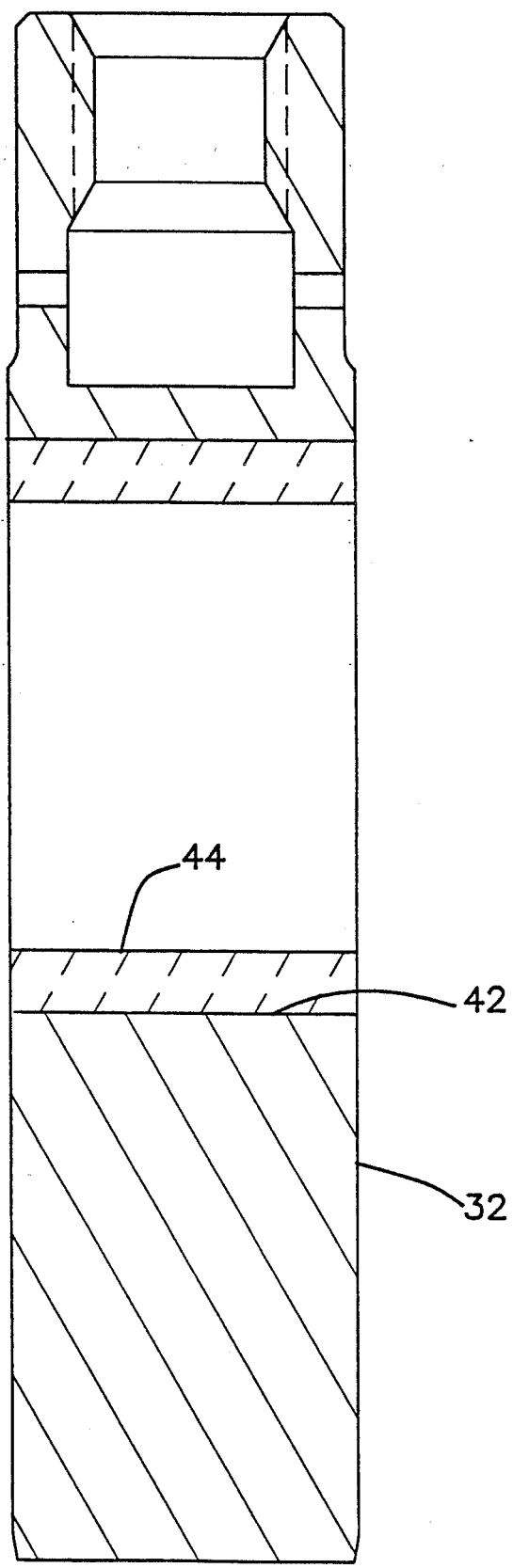
FIG. 5 is a sectional view taken along line 5—5 in FIG. 4 to show the position of the ring extending through the gate in surrounding relationship to the gate opening.

As shown in FIGS. 4 and 5, gate 32 is a generally flat elongated plate and includes means 66 for suitable connection to connecting rod 30 and opening 42 in which sleeve 44 of hardened material is positioned. Sleeve 44 is made of the same or similar material to the material of insert ring 46. The inner diameter of opening 42 is sized with respect to the external diameter of sleeve 44 so that on insertion of sleeve 44 therein (by a shrink fit), it is preloaded with sufficient compression preloading to ensure that it will not be loaded in tension during its use. This is done, preferably in the same manner as the assembly of insert ring 46 within seat ring 34. Gate 32 is heated sufficiently to allow sleeve 4 to be readily inserted into opening 42. The diameter of opening 42 is sufficiently smaller after cooling than the outer diameter of sleeve 44 to provide the desired preselected compression preload on sleeve 44. This will ensure that during all operations of gate 32, sleeve 44 will be under compression and will perform its sealing and shearing functions without destruction, chipping or other damage thereto. The compressive preload on sleeve 44 is sufficient to ensure that there is no relative movement between sleeve 44 and gate 32 during operation of gate valve 10.

Testing of a 2 9/16 inch, 15,000 psi model of the improved design shearing gate valve has resulted as follows:

| Size | Type | Time Cut |
|---|---|---|
| .082" | Solid Wire | 2 |
| .092" | Solid Wire | 3 |
| .108" | Solid Wire | 7 |
| .188" | Stranded Wire | 8 |
| .219" | Stranded Logging Cable | 3 |
| .250" | Stranded Logging Cable | 2 |
| .469" | Stranded Logging Cable | 3 |
| .188" | Stranded, Bundle of 12 | 1 |
| 1.00" | .095" Wall Tubing | 1 |
| 1.25" | .109" Wall Tubing | 2 |
| 1.75" | .109" Wall Tubing | 1 |
| .469" | Stranded Logging Cable Inside 1.0" × .095" Tubing | 1 |
| .469" | Stranded Logging Cable Inside 1.25" × .095" Tubing | 2 |

The valve was tested to full rated working pressure of 15,000 psi after each shearing with no detectable leakage.

The present invention used on a well and having a wire line or cable extending therethrough is positioned to have the left side of the valve as shown in the drawings connected facing in the downward direction. The wire line or cable which is sheared by the gate is dropped in the well and with the valve 10 the portion between seat rings 34 and 36 is retained in the opening through sleeve 44. In some applications, it is a simple matter to fish for the lost wire line or cable and recover it from the well after the gate is again opened but the short section of the cable trapped in the gate and falling into the well may be harder to remove from the well and be a problem if not removed. For that reason the two modified forms of the present invention hereinafter described with respect to the remainder of the drawings have all of the advantages of valve 10 and do not allow a short section of the cable or wire line to drop into the well. This is accomplished by providing a structure in which there is a single shearing of the wire line or cable and a configuration to allow the lower portion of the sheared cable element to fall from the interior of the gate and from the valve into the well without any short section being sheared for its upper end.

Valve member or gate 100 includes the usual threaded opening 102 in which the valve stem (not shown) attaches to the gate 100. Bore 104 extends partially through gate 100 and intersects with tapered bore 106 which extends through the remainder of gate 100. Counterbore 108 extends into gate 100 and forms shoulder 110 with bore 104 and annular surface 112 into which insert sleeve 114 is inserted as shown. Seat ring 116 is positioned to engage the face of gate 100 surrounding bore 104 and counterbore 108 and includes annular groove 118 to accommodate a seal ring and a counterbore 120 which receives insert sleeve 122 as shown. Seat ring 124 is positioned to engage the face of gate 100 on the side of the opening of tapered bore 106 and has opening 126 therethrough which mates with the diameter of tapered bore 106 opening in the side of gate 100 and converges to a smaller diameter to mate with the diameter of the flow passage which it engages in the valve. Insert sleeves 114 and 122 are made of hard materials such as tungsten carbide previously described and are maintained in compression.

Figure 6:
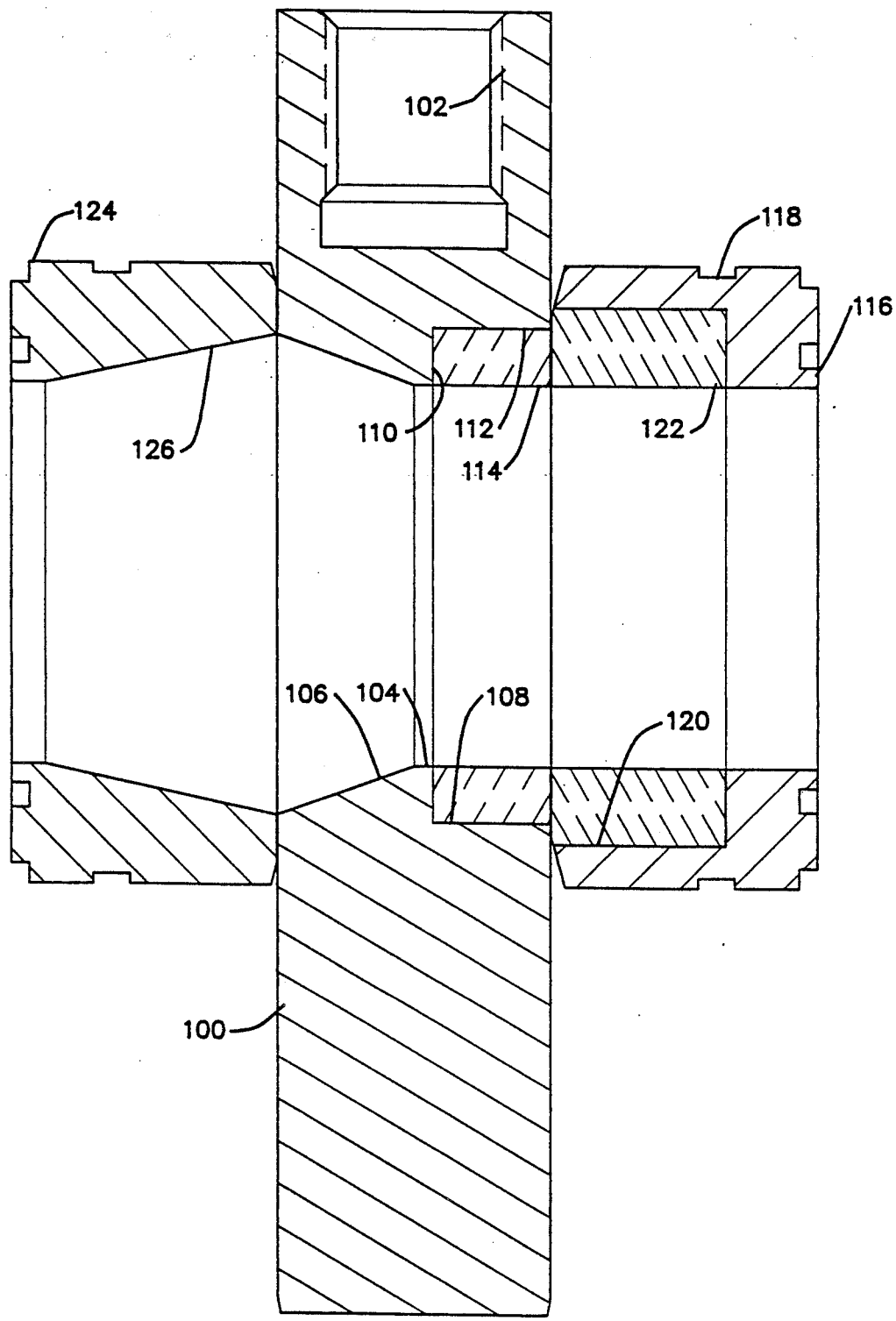
FIG. 6 is a sectional view of the valve member having a partial sleeve insert and the seat rings which coact with the valve member in a modified form of the present invention which provides shearing on one edge of the valve member and allows the sheared element to withdraw from the other side before the valve member is fully closed.

With the structure shown in FIG. 6 any cable or wire extending through the opening in the gate 100 is sheared by the shearing action between insert sleeve 114 with insert sleeve 122 as the gate 100 moves to its closed position. It should be noted as hereinafter explained that the shearing action is complete before the open area communicating between tapered bore 106 and opening 126 has closed sufficiently to restrict the movement of the cable element. This allows the wire or cable remaining therein to drop or be pulled therefrom before gate 100 is in its closed position.

Figure 7:
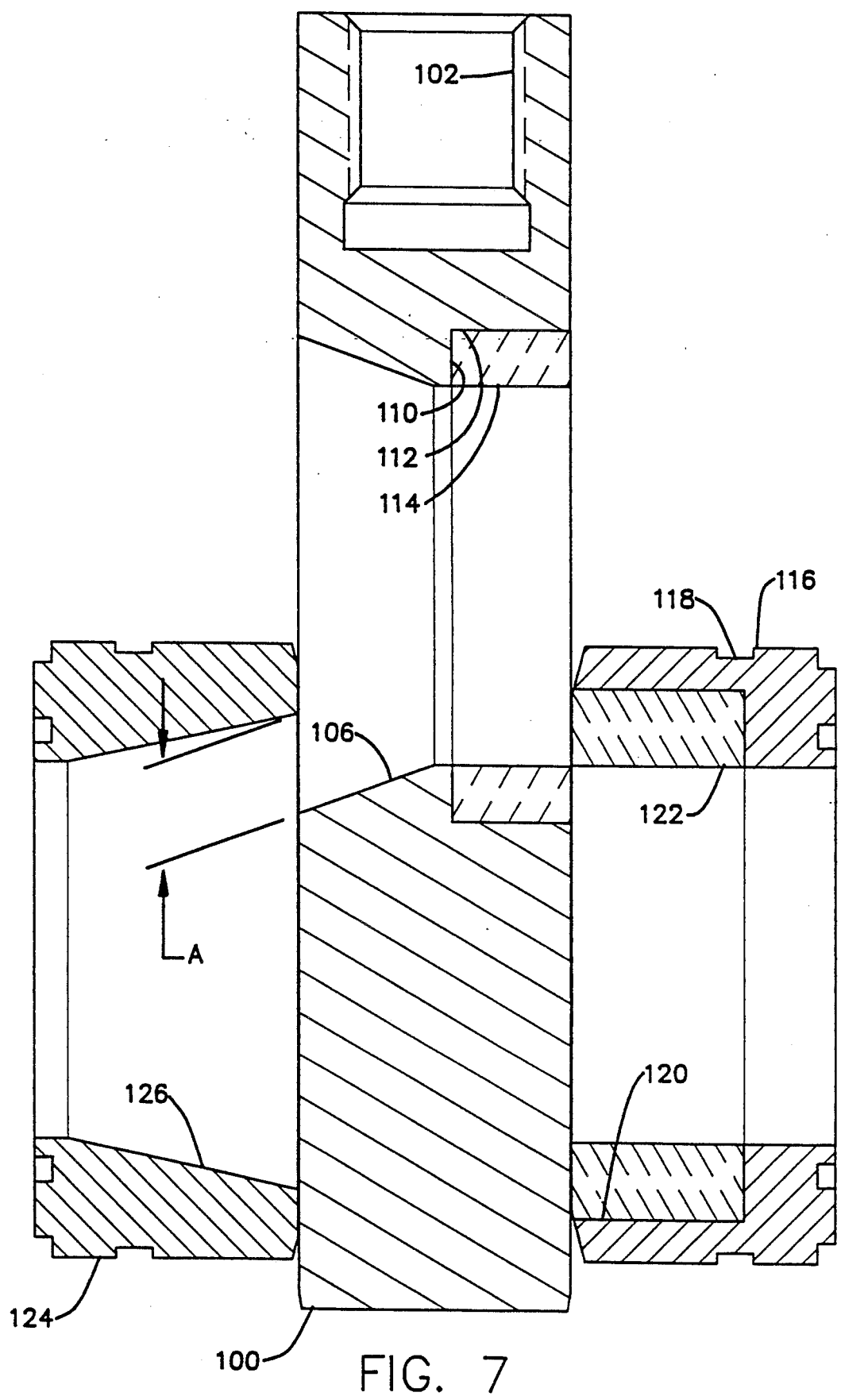
FIG. 7 is a similar sectional view of the structure shown in FIG. 6 but with the valve member or gate sufficiently closed to have substantially completed its shearing of the cable or wire extending therethrough.
Figure 8:
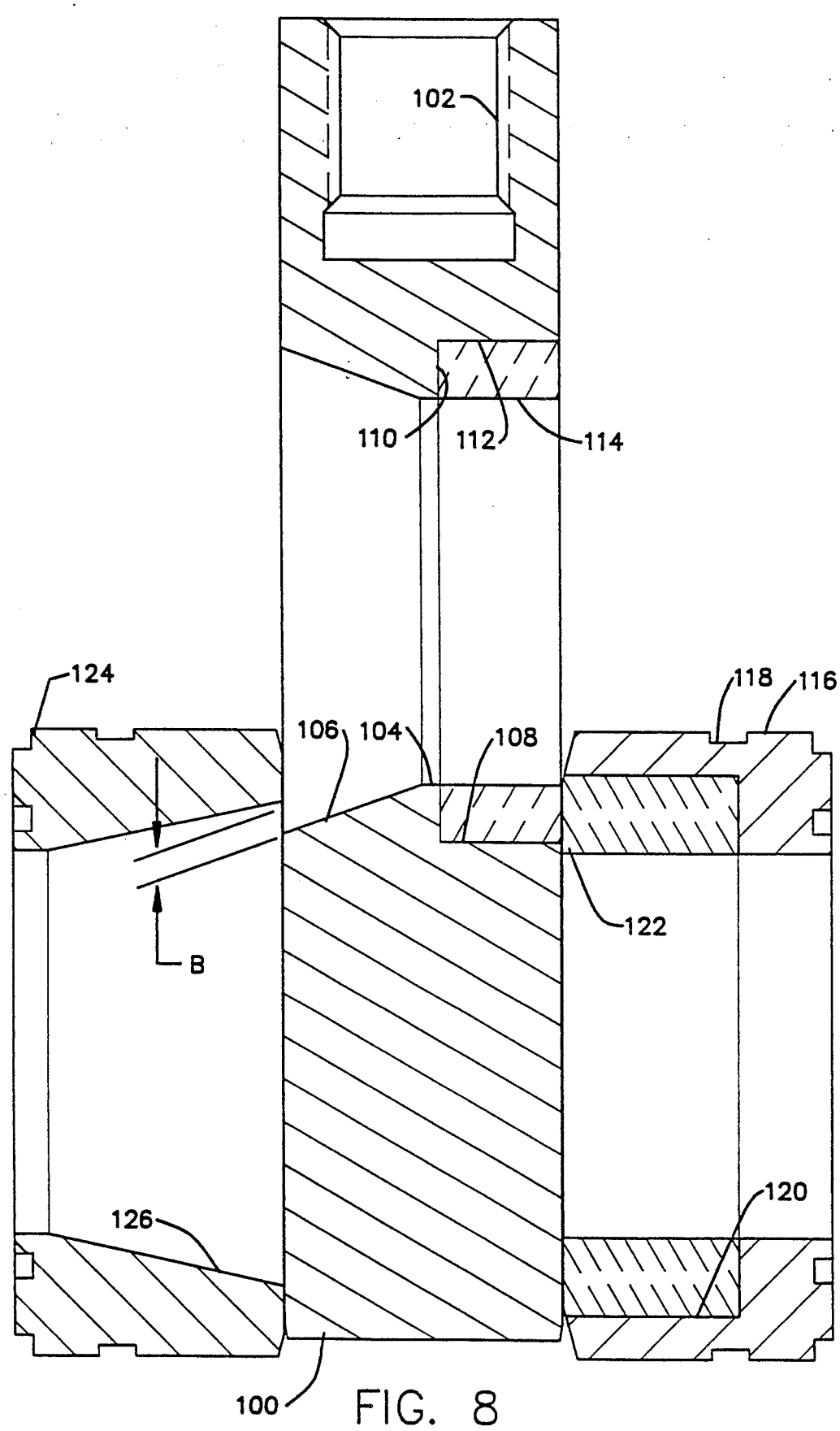
FIG. 8 is another similar view with the valve member or gate in its completed shearing position to illustrate the wider opening of the non-shearing side of the gate.

As illustrated in FIG. 7, gate 100 has moved to its substantially closed position with either complete shearing or almost complete shearing of any cable element extending through the valve. The dimension A illustrates the opening on the non-shearing side of gate 100 in this position which is more than sufficient to allow the cable element to fall or be removed from the interior of gate 100. Further closing of gate 100 is illustrated in FIG. 8. Dimension B illustrates the opening on the non-shearing side of gate 100 after the shearing is complete between insert sleeve 114 and insert ring 122. In the valve illustrated it is preferred that the diverging taper on the tapered bore 106 and the taper on the bore 126 of seat ring 124 have angles of taper which are preferred to be in the range of 10 to 12 degrees or less and at most 15 degrees or less so that there is a minimum of disturbance to the flow therethrough and still provide the opening through which the lower sheared portion of the cable element can drop from the gate bore before the gate completely closes.

Figure 9:
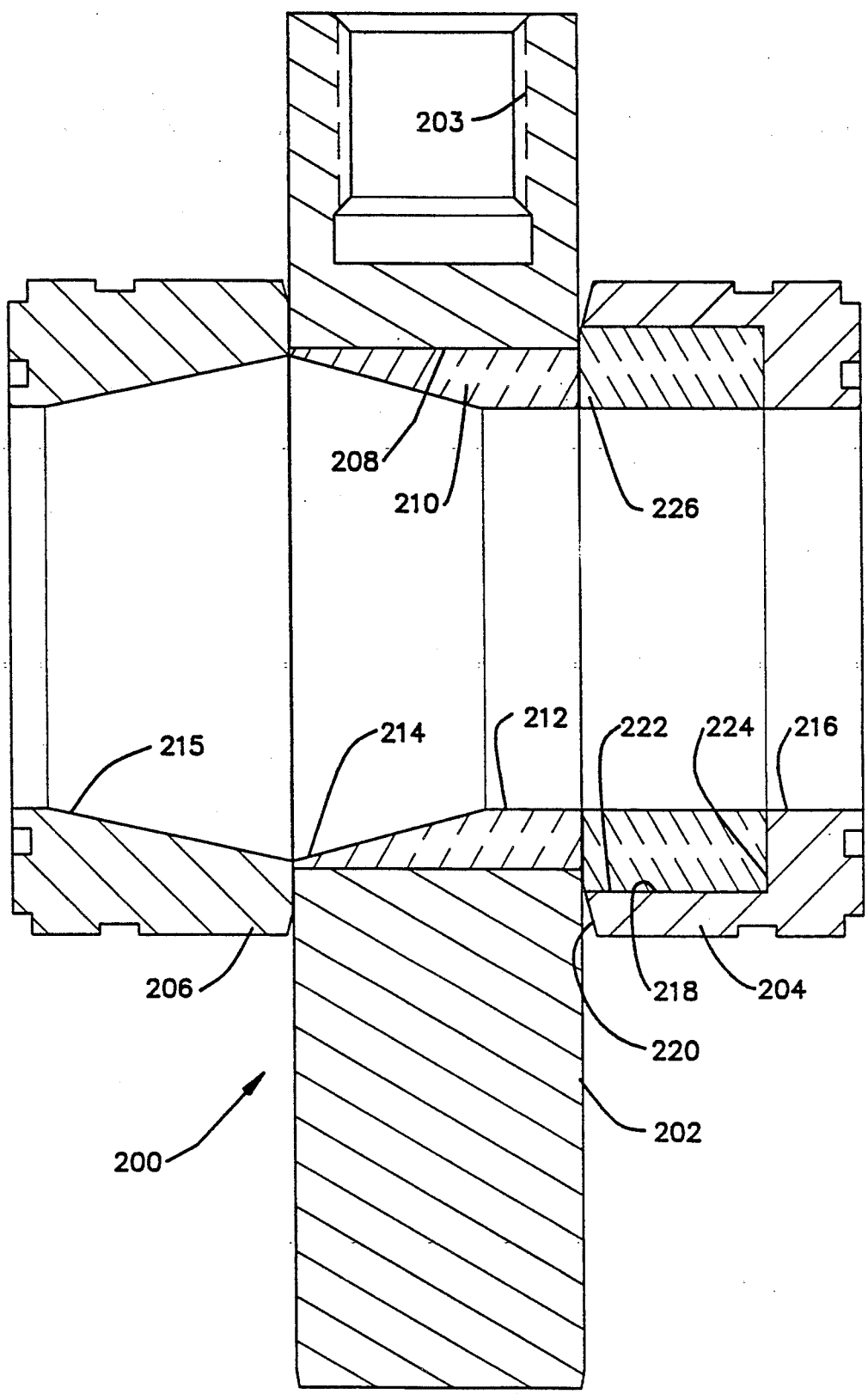
FIG. 9 is a view of another modified form of the present invention showing only the valve member or gate and the seat rings with the gate in the open position.
Figure 10:
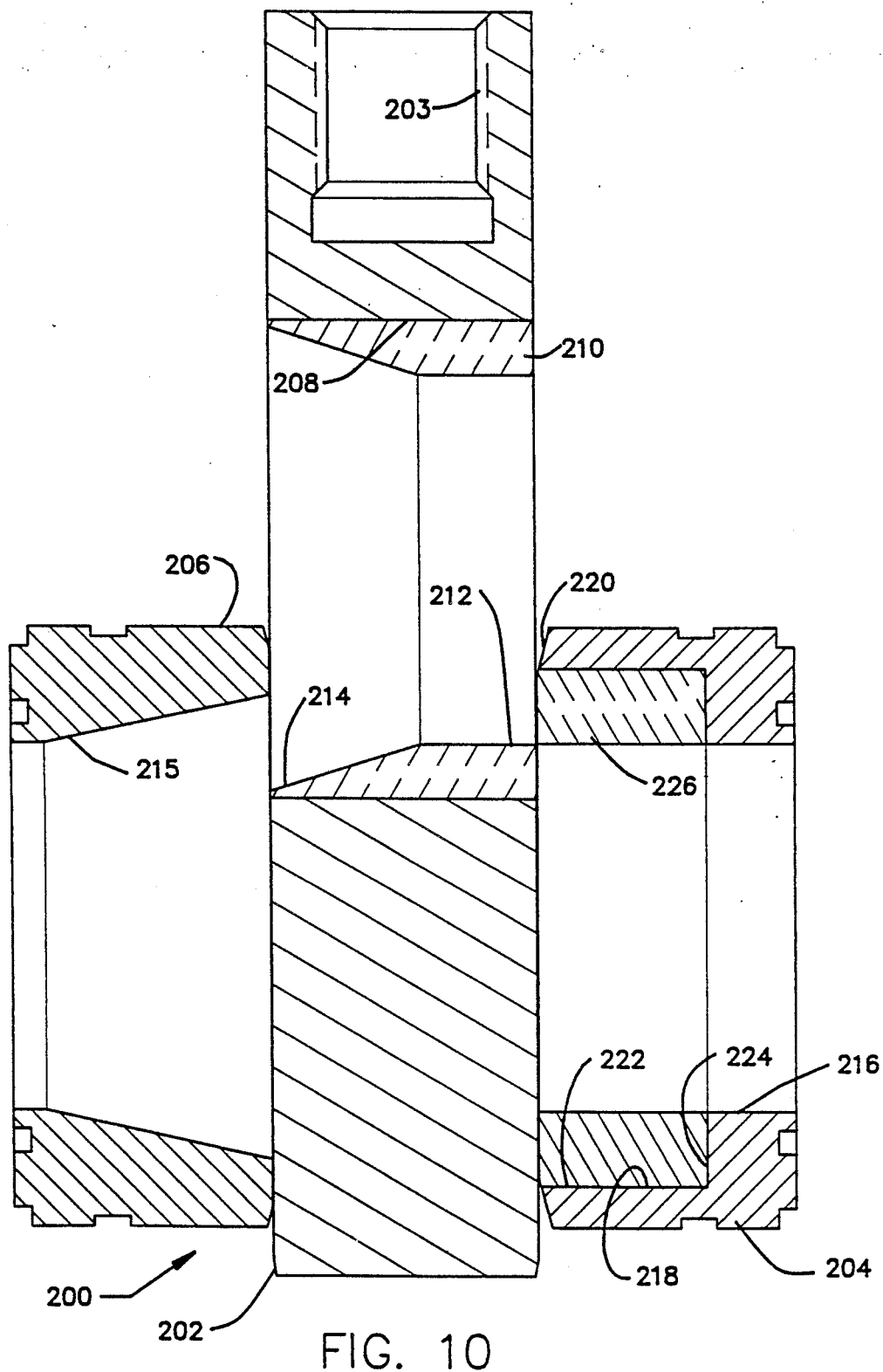
FIG. 10 is a view of the structure shown in FIG. 9 with the gate in its complete shearing position with respect to the seat rings.
Figure 11:
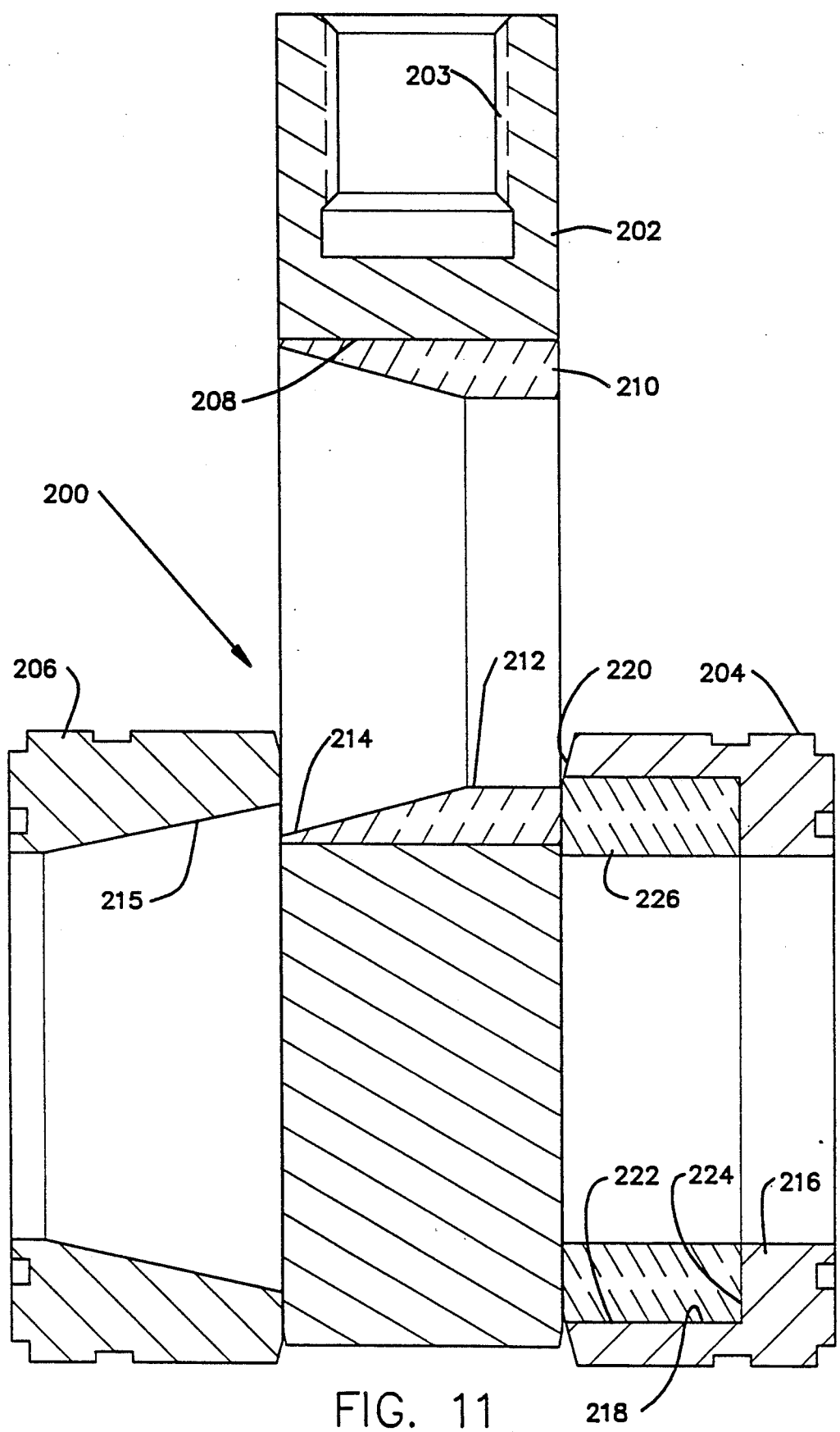
FIG. 11 is a view of the structure shown in FIGS. 9 and 10 with the gate in its closed and sealed position with respect to the seat rings.

Valve 200, shown in FIGS. 9, 10 and 11, is similar to valve 100 in that it provides the single shearing of the cable element to avoid the problem of the short cable element section being sheared and dropped into the well separate from the remainder of the cable element. Valve 200 is similar in structure to valve 10 except for the structure of the gate and the seat rings which are shown in the drawings. Gate 202 is of the usual form and has a means 203 for connecting to a valve stem (not shown) and is positioned between seat rings 204 and 206 as shown. Bore 208 extends through gate 202 and insert sleeve 210 is positioned therein. Sleeve 210 is of a hard material as previously described and is preloaded in compression for the reasons previously described. Sleeve 210 includes outlet bore 212 and inlet tapered surface 214 which diverges outwardly toward seat ring 206. Seat ring 206 includes tapered surface 215 on its interior which mates with the diameter of the inlet end of tapered surface 214 and reduces the bore in seat ring 206 to the flow diameter through the valve passages.

Seat ring 204 has central bore 216 and counterbore 218 which extends inwardly from side 220 of seat ring 204 which engages gate 202 and forms cylindrical surface 222 and shoulder 224. Insert ring 226 is positioned in counterbore 218 with the diameter of surface 222 being preselected to provide the desired preloading compression of insert ring 226 which is made of a hardened material such as tungsten carbide or other materials as previously discussed.

As shown in FIGS. 9, 10 and 11, gate 202 is shown in its open position (FIG. 9), in its position at the completion of shearing of the cable element (FIG. 10) and in its closed position of sealing against seat ring 204. As can be seen in FIG. 10, with the completion of the shearing of the cable element extending through gate 202, there is sufficient open space between the interior of gate insert sleeve 212 and the interior of seat ring 206 to allow the sheared cable element to fall into the well without any additional shearing of the cable element.

From the above it can be seen that the improved design of the shearing gate valve of the present invention provides a gate valve which can shear a wire line or other tubular member extending therethrough without damage to the hardened insert rings or the hardened insert sleeves or without in any way interfering with the sealing of the gate and the seat ring. This allows the valve 10 to be used without repair or replacement through many cycles of closing and shearing whereas shearing gate valves of the prior art could only be expected to accomplish a single shearing and even following such single shearing may have been damaged sufficiently to provide an imperfect seal. It should be noted that the use of the forms of the present invention which provide the single shearing of the cable element require less force to complete the shearing of the cable element that the form of the present invention which provides the dual shearing of the cable element.

What is claimed is:
1. A shearing gate valve comprising
   a body having an inlet, an outlet, a valve chamber communicating with the inner ends of said inlet and said outlet, a recess surrounding the opening of each of said inlet and said outlet into said valve chamber,
   a seat ring positioned in each of said recesses within said valve chamber and having a bore therethrough to align with the inlet and outlet,
   a gate movably positioned within said valve chamber and having an opening therethrough which aligns with the bores of the mating seat rings to open and close flow through said body responsive to movement of the gate in said valve chamber, an insert sleeve positioned within said opening through the gate and having a bore which aligns with the mating bores in said seat rings, an actuator connected to said body and to said gate for moving said gate between its open and closed positions, and an insert ring positioned within one of said seat rings, said insert sleeve and said insert ring being of a hard, wear resistant material, said insert sleeve and said insert ring being installed and maintained in their respective positions in a compression preload condition which is sufficient to resist damage thereto during closing, sealing and shearing operations of the valve, said insert sleeve extends only partly through said gate opening, only one of said seat rings includes an insert ring to coact with said insert sleeve in shearing cables extending through said valve, said opening through said gate tapes to a larger opening on the side of the gate opposite to said insert sleeve, said seat ring on the side of the gate having a larger bore mating with the larger opening at the outlet of the gate and tapering to the smaller size of said outlet.

2. A shearing gate valve according to claim 1 wherein said hard, wear resistant material of said insert sleeve and said insert ring is tungsten carbide.

3. A shearing gate valve according to claim 1 wherein said hard, wear resistant material of said insert sleeve and said insert ring is a material having compression and wear resistant properties approaching those properties of tungsten carbide.

4. A shearing gate valve according to claim 1 wherein said insert sleeve extends through said gate opening, at least one of said seat rings includes an insert ring of hard, wear resistant material to coact with said insert sleeve in shearing cable elements extending through the valve.

* * * * *